(No Model.)
A. H. AIKMAN & G. K. OSBORN.
AUTOMATIC CUT-OFF VALVE.
No. 268,594. Patented Dec. 5, 1882.
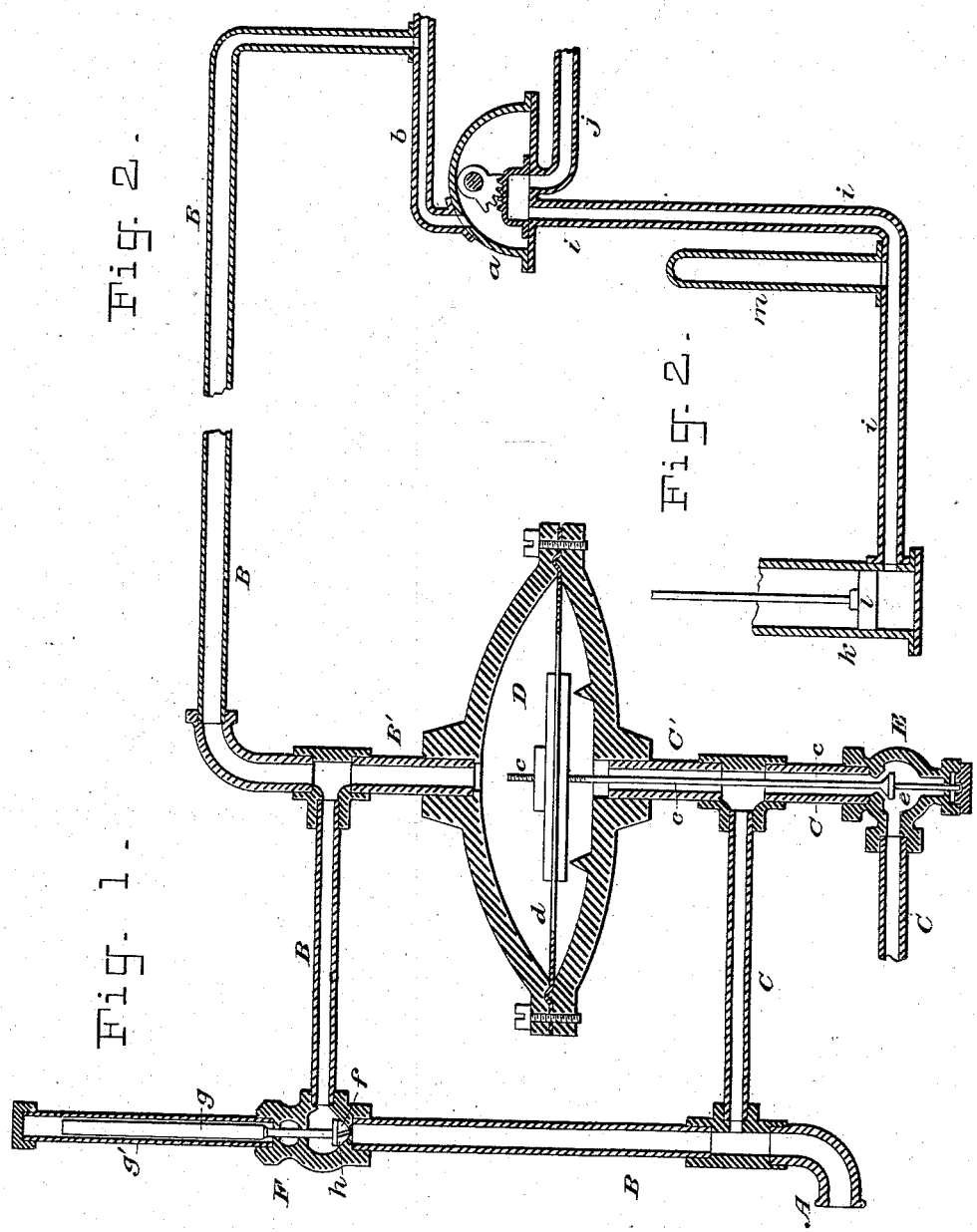
WITNESSES:
INVENTORS:

UNITED STATES PATENT OFFICE.

AUGUSTUS H. AIKMAN, OF BROOKLYN, AND GEORGE K. OSBORN, OF NEW UTRECHT, NEW YORK, ASSIGNORS TO THE NEW YORK KEROSENE GAS LIGHT COMPANY, OF NEW YORK, N. Y.

AUTOMATIC CUT-OFF VALVE.

SPECIFICATION forming part of Letters Patent No. 268,594, dated December 5, 1882.

Application filed April 13, 1882. (No model.)

*To all whom it may concern:*

Be it known that we, AUGUSTUS H. AIKMAN, of Brooklyn, in the county of Kings and State of New York, and GEORGE K. OSBORN, of New Utrecht, in said county and State, have jointly invented an Improved Automatic Cut-Off Valve, of which the following is a specification.

Our invention relates to valves for controlling or directing the supply of fluids, being primarily designed for directing the supply of water to intermittent hydraulic engines and the like, although applicable to other uses.

It frequently occurs that two or more services or outlets are supplied from one pipe, and that in case at any time the supply is insufficient for both one must be given the preference over the other or others—that is to say, that one must be supplied, even if it takes the entire supply and completely deprives the others thereof.

The object of our invention is to provide a simple and effective automatic valve for this purpose.
In the accompanying drawings, Figure 1 shows our valve and its connections in midsection, and Fig. 2 illustrates the connection therewith of a special form of intermittent preferred service, being a hydraulic air-pump similar to that shown in our Patent No. 237,153, dated February 1, 1881, or, more properly, an air-pump operated by a hydraulic engine.

Let A designate the supply or service pipe leading from a street-main or other supply of water under pressure and dividing into two branches, B and C. The pipe B leads eventually to the preferred service, and the pipe C to the ordinary service, which is, if necessary, to be deprived of water at times.
D is a diaphragm-chamber divided by a flexible diaphragm, $d$, into two compartments, one of which communicates with the pipe B through a pipe or orifice, B', and the other of which communicates with the pipe C through a pipe or orifice, C'. In the pipe C, beyond the pipe C', is a valve, E, consisting of a cone or disk, $e$, mounted on a rod or stem, $c$, which passes through the pipes C C' and connects with the diaphragm $d$, so that the movements of the latter will seat or unseat the cone $e$. Beyond the valve E the pipe C extends to the one or several services or outlets employed, which, for convenience, we will refer to as the faucets of a house.

In the pipe B, between its connection with the pipe A and its junction with the pipe B', is arranged a check-valve, F, consisting of a cone or disk, $f$, having the pressure of a weight, $g$, in a tube, $g'$, or of a spring applied to it to normally force it against its seat. The cone $f$ is notched at $h$, or else a notch or groove is cut in its seat, or by some other means it is made to leak to a slight extent.

The pipe B, beyond the pipe B', extends to the preferred service, which, for the purpose of illustrating the utility and operation of our invention, we will assume to be a hydraulic air-pump, similar to that embodied in our said Patent No. 237,153, a fragment of which is shown in Fig. 2. For a description of this pump we would refer the public to that patent, remarking, however, that we have here in Fig. 2 shown the hydraulic cylinder and piston as inverted with respect to the arrangement shown in that patent, the cylinder being now fixed and the piston moving therein and connected through its rod to the air-bell. In Fig. 2 the pipe B connects to a pipe, $b$, which extends to the two valves $a$ of the double-acting pump, but one of which valves is shown. The valve $a$ is a slide or D valve and controls the parts leading to pipes $i$ and $j$. The pipe $j$ is an exhaust leading to a waste, and the pipe $i$ leads to the cylinder, (lettered $k$,) the piston being lettered $l$. Connected to the pipe $i$ is an air-chamber $m$.

The operation is as follows: In the drawings the devices are shown in the position assumed when the air-pump or other preferred service is not using water. The pressure from the pipe A is communicated through the pipes B and C, thence through the pipes B' and C' to the chamber D, where it is equal on opposite sides of the diaphragm $d$. The adjustment of the valve E is such that with an equal pressure on opposite sides of the diaphragm it opens and permits the passage of water through the pipe C to the faucets or other service which said pipe supplies. If, now, the valve $a$ be shifted so as to admit water to the pump-cylinder $k$, the pressure in the pipes B and B' and on the upper side of the diaphragm $d$ is decreased, and the pressure below the diaphragm lifts the latter, so that the valve E is seated and the passage through the pipe C closed, thereby directing the entire flow through the pipe B to the pump. To prevent the pressure above the diaphragm then equaling that below it the valve F is provided, which serves to slightly repress or retard the flow, so that the water will expend a small portion of its power in lifting this valve, and will consequently be under less pressure after passing it than before. When, however, the piston $l$ at the pump reaches the end of its stroke and the flow stops, the leakage at $h$ quickly equalizes the pressure on opposite sides of the valve F, whereupon the diaphragm $d$ resumes its normal position and opens the valve E.

The above description is of the operation in case there is no outflow through the pipe C when the pump-valve is opened. If the faucets supplied by pipe C be open, it is evident that the pressure in that pipe will be diminished, and by the leakage through the valve F the pressure beyond that valve in the pipes B B' will eventually be reduced until it equals the pressure in the pipe C, and when the pump-valve is opened it will effect a still further reduction of pressure in the pipes B B' sufficient to cause an upward deflection of the diaphragm and the closure of the valve E; but if, while water is flowing out through the pipe C, and before the leakage through the valve F has equalized the pressure in the pipes B' and C', the pump-valve were opened, it might sometimes occur that the reduction of pressure in the pipes B B' thereby caused would be insufficient to operate the diaphragm, since the opening of the pump-valve does not materially reduce the pressure in the pipe B on account of the resistance which the water must overcome in working the piston $l$. To provide against this we have furnished the air-chamber $m$ in the pipe beyond the pump-valve $a$. As the water passes that valve and flows into the pipe $i$ it encounters the resistance offered by the piston $l$ and backs up against the cushion of air in the chamber $m$, which momentarily relieves the pressure on the water, and this momentary decrease of pressure is sufficient to cause the operation of the diaphragm, for it is evident that as soon as the diaphragm has closed the valve E the pressure below it must instantly increase, so that any increase of pressure above it which the valve F will admit of will be insufficient to force it downward again. The air-chamber $m$ will be unnecessary in case the preferred service is a mere faucet discharging water into the open air, as in that case the pressure will be instantly lowered by the act of opening the faucet.

If any one of the faucets supplied by the pipe C is open, the flow therefrom will stop when the faucet or other preferred service supplied by the pipe B is opened, and it will be resumed a moment after the outflow through the pipe B ceases.

The sole purpose of the valve F is to decrease the pressure in the pipe B beyond it. It may perhaps be replaced by other devices for the same purpose—as, for instance, some obstruction in the pipe to retard the flow, or a leak from the pipe, as by a branch pipe tapping it.

Although designed for hydraulic use, our valve is equally applicable to controlling the flow of steam, compressed air, or other gases.

It will be understood that our device is capable of considerable structural modification without departing from its essential features, and that therefore our detailed description of the precise construction shown in the drawings must not be construed as limiting us thereto. Among other modifications the valve E might be a turn-cock and the stem $c$ be jointed to the end of its radial operating arm or handle.

We are aware that the use of diaphragm-regulators to control automatically the flow of a fluid through a pipe is common, and we make no claim thereto; but What we do claim, and desire to secure by Letters Patent, is as follows:

1. An automatic cut-off consisting of a diaphragm, a fluid chamber on each side thereof, means for reducing the pressure on one side of the diaphragm, a valve in a supply-pipe adapted to close the passage therethrough, and a connection between said valve and the diaphragm, substantially as and for the purposes set forth.

2. The combination, with a pipe arranged to supply two or more services through two branches, of a chamber divided by a diaphragm into two compartments, means of communication between one of said branch pipes and one of said compartments and between the other branch pipe and the other compartment, a cut-off valve in one of said branch pipes, connected to and operated by said diaphragm, and means, substantially as described, for decreasing the pressure in the other of said branch pipes, arranged therein between its junction with the main supply-pipe and its connection with the diaphragm-chamber.

3. The combination of pipes A, B, C, B', and C', valves E and F, diaphragm-chamber D, and diaphragm $d$, arranged and adapted to operate substantially as set forth.

4. The combination of pipes A, B, C, B', and C', valves E and F, diaphragm-chamber D, diaphragm $d$, a hydraulic-engine cylinder, $k$, arranged to be supplied by pipe B, and an air-chamber, $m$, in connection with said pipe, substantially as and for the purposes set forth.

In witness whereof we have hereunto signed our names in the presence of two subscribing witnesses.

A. H. AIKMAN.
GEO. K. OSBORN.

Witnesses:
ARTHUR C. FRASER,
HENRY CONNETT.